United States Patent [19]
McNeely et al.

[11] 3,853,656
[45] Dec. 10, 1974

[54] DRY LAY-UP METHOD AND APPARATUS FOR PRODUCING CONTINUOUS LENGTH COMPOSITE MEMBERS

[75] Inventors: Arthur O. McNeely, Redondo Beach; Wiley T. Kennedy, Santa Ana, both of Calif.

[73] Assignee: Mackenhus Corporation, Santa Ana, Calif.

[22] Filed: July 17, 1972

[21] Appl. No.: 272,378

[52] U.S. Cl............... 156/172, 156/175, 156/180, 156/274, 156/425, 156/431, 156/441
[51] Int. Cl..................... B65h 81/02, B65h 81/06
[58] Field of Search .......... 156/172, 173, 175, 180, 156/441, 428, 430, 431, 425, 432, 433

[56] References Cited
UNITED STATES PATENTS

| | | | |
|---|---|---|---|
| 2,731,067 | 1/1956 | Miller | 156/432 |
| 2,751,320 | 6/1956 | Jacobs et al. | 156/441 |
| 3,067,803 | 12/1962 | Fleury | 156/431 |
| 3,336,176 | 8/1967 | Medney | 156/173 |
| 3,470,051 | 9/1969 | Meyer | 156/172 |
| 3,579,402 | 5/1971 | Goldsworthy et al. | 156/432 |

Primary Examiner—Daniel J. Fritsch

[57] ABSTRACT

A method and apparatus for application to the art of pultrusion and adapted to produce continuous length composite members of uniform cross sectional configuration; firstly characterized by dry formation of a multi-laminiform comprised of individual filaments laid in selectively disposed positions longitudinally, circumferentially, spirally and/or diagonally relative to the axis of the composite being formed; and secondly characterized by subsequent external and internal impregnation, or both, with solidifying material and preferably with a liquid thermosetting resin that is cured by the application of heat thereto; a feature being the means employed in the placement and retension of placement of the multiplicity of filaments involved in each lamina of the composite, said means being characteristically a carding means which combs the filaments into placement.

75 Claims, 15 Drawing Figures

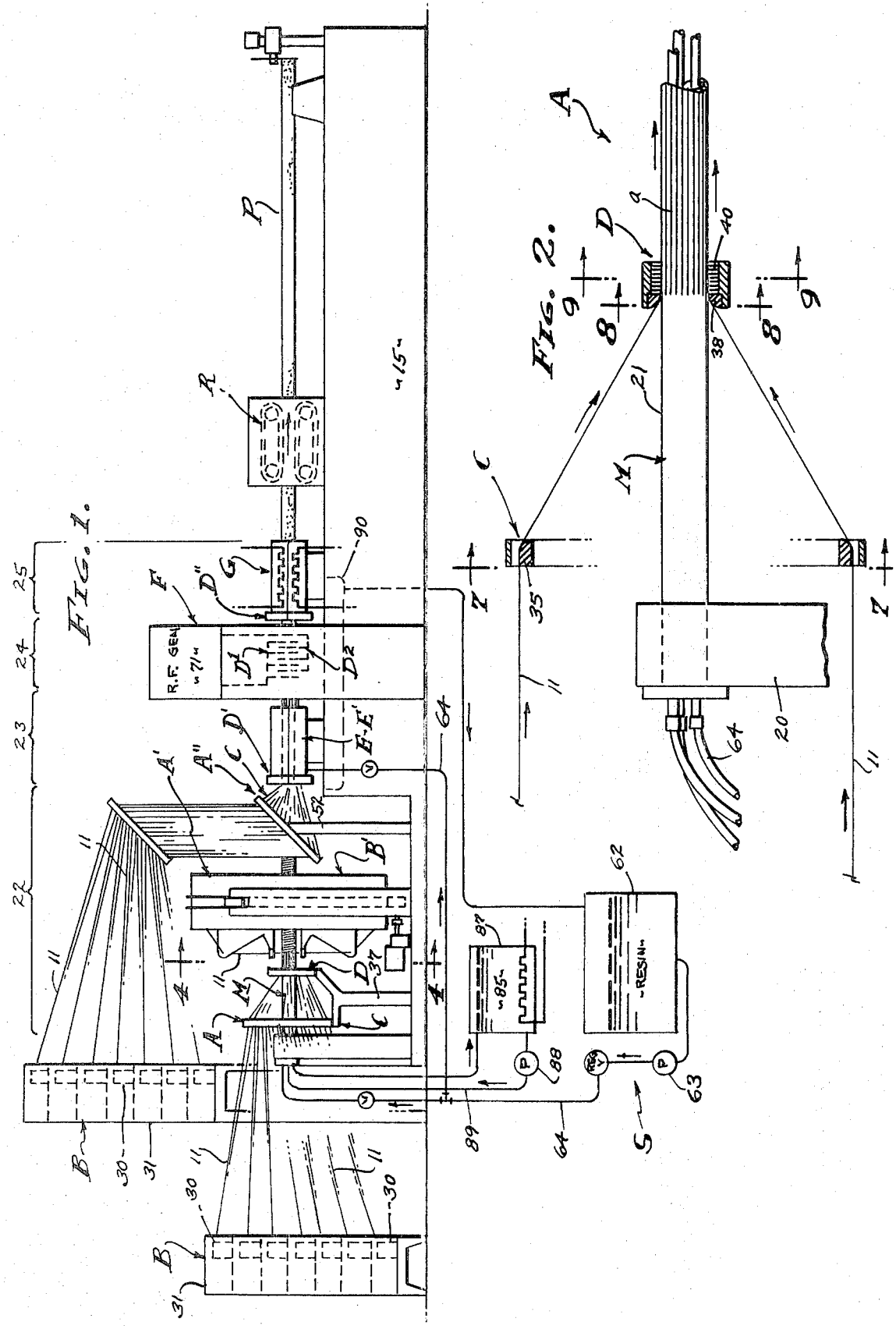

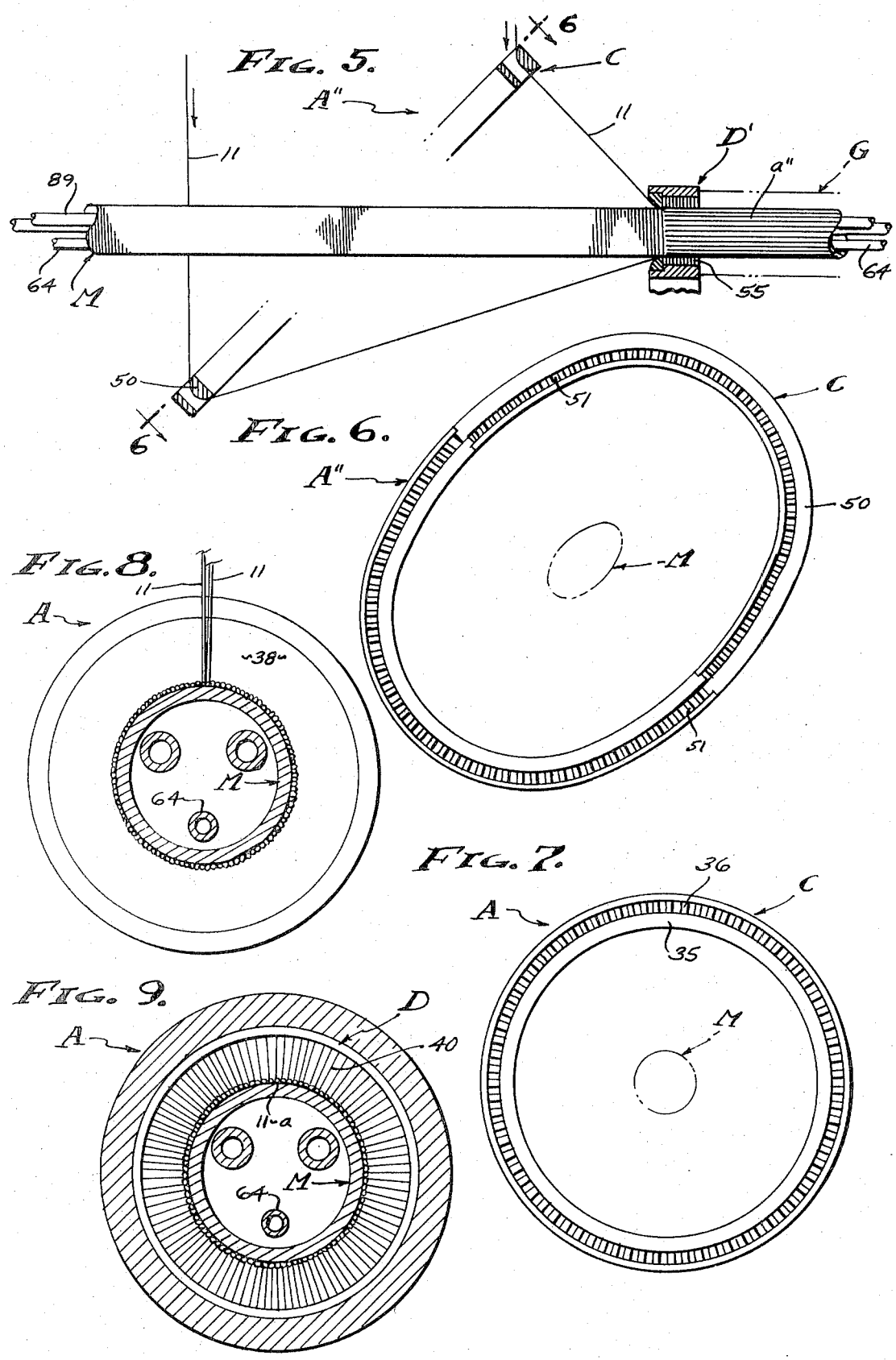

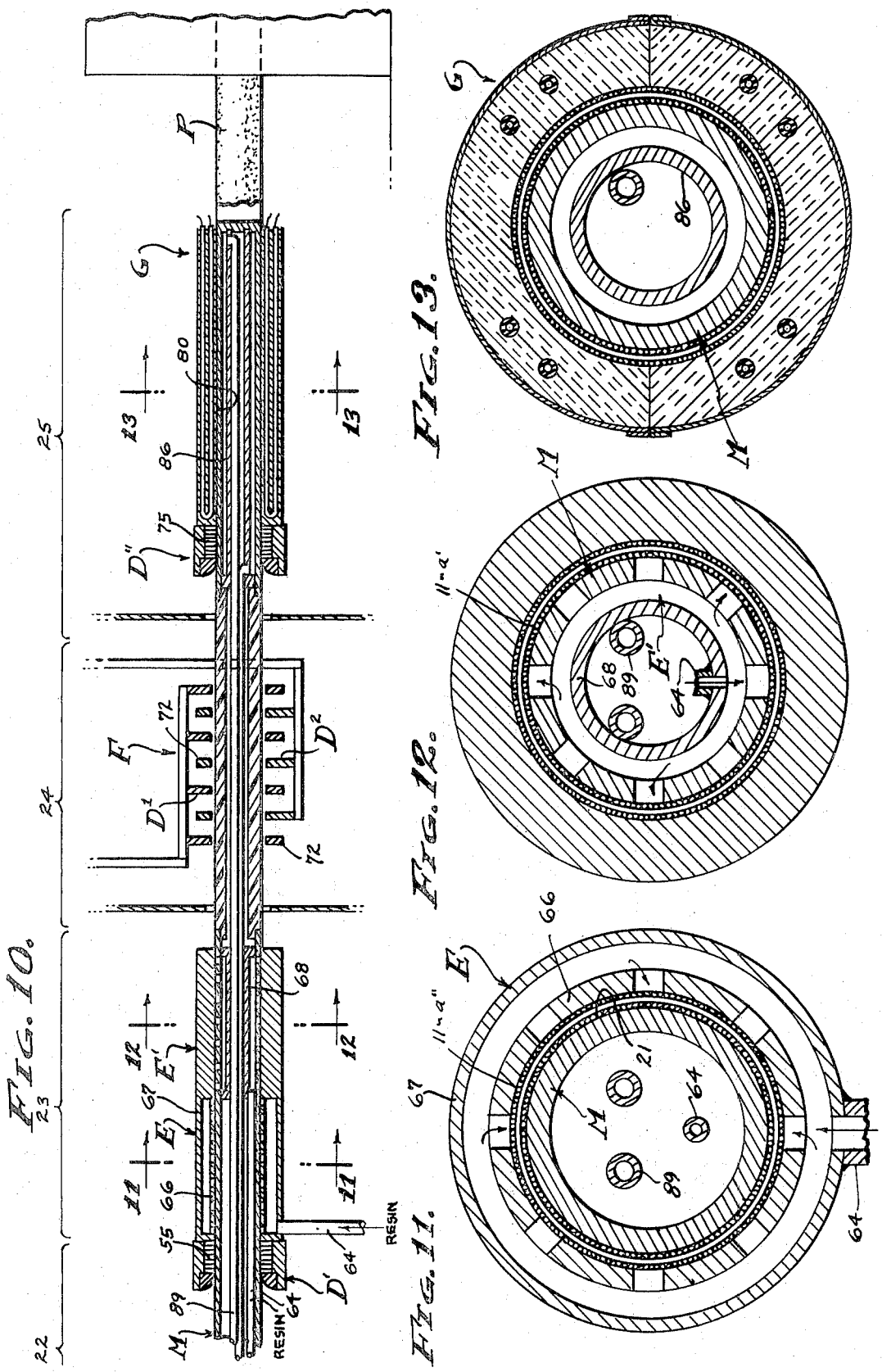

DRY LAY-UP METHOD AND APPARATUS FOR PRODUCING CONTINUOUS LENGTH COMPOSITE MEMBERS

Reference is made to Disclosure Document No. 010,769 filed May 12, 1972 which sets forth generally the improvements herein disclosed.

BACKGROUND

The prior art pultrusion machines and methods laminate filaments, ribbons and layers or sheets of material by drawing the same through shaping dies and over mandrels, and various combinations thereof as determined by the cross section of composite product desired. The cross sections vary widely from tubular to bar shape and/or open-flanged members; and all of which are composed of fiberous materials laid in place and bonded together as an integral body by a solidifying material applied thereto. The unit length cost of producing such members depends greatly upon the initial costs of the materials that are to be fabricated, and the more complex materials such as cloth are more costly than basic materials such as simple fibers and/or straight roving. Therefore, it is a general object of this invention to provide a dry lay-up of fibers held to form and then impregnated with solidifying materials.

The uniform displacement of fibers in the form of parallel filaments poses a problem in the formation of composite laminiform products of the type under consideration. In shapes such as tubes, bars and open sections, floatation of the filaments is involved and which results in non-uniformity of laminae thickness and consequent wall thickness variances; and all to the end that discrepancies occur that destroy the effectiveness of the composite product. More particularly, the density of glass fiber is, for example, greater than that of the usual resin binder, and to the end that filaments of glass fiber tend to sink; while the contrary phenomenon occurs with organic fiber such as for example, Sissal or Hemp which floats in a typical resin binder. Therefore, a feature of this invention is the dry lay-up of filaments and the carding means which retains the placed positioning thereof. The laminiform of filaments is laid in place and processed by combs which maintain said placement; the said carding means being employed in the dynamic placement of filaments in the moving laminiform as it is progressively transported forwardly for its processing into a completed composite product and issuance from the apparatus employed to process the same.

The prior art is attended with difficulties involved in the said lay-up of filaments and ribbons of fiberous materials which are supposedly advanced in contiguous parallel paths through rollers or sizing bushings for the removal of surplus resin and air therefrom. That is, the prior art practice is to thoroughly wet the fiberous material and then extract the excess liquid while bringing the multiplicity of fibers together as a unit, but not necessarily excluding air bubbles entrapped as a result of the step of bringing the fiberous elements into contiguity. In other words, entrained air is not necessarily eliminated by initial wetting, and quite to the contrary elimination of entrapped air in the finished composite is assured by the present invention with its initial dry lay-up of filaments before impregnation with resin binder. With the present invention, the laminiform of dry filaments is pulled through a liquid impregnation means and is thereafter passed through a heat zone and brought to the range of temperature conducive to curing; or the equivalent.

An object of this invention is to provide for the uniform and predetermined placement of multiplicity of fibers in a laminiform composite, and all of which is accompanied in the dry lay-up of filaments in multiple layers before impregnation with resin binder, and the carding means which retains the placed positioning of the filaments. The laminiform of filaments is laid onto a mandrel as and when required and is then drawn through a liquid impregnation means preceeded by carding means for maintaining the even distribution of the outer and otherwise loose exterior filaments. Immediately thereafter, the laminiform passes into said impregnation means to be saturated with resin, for example, from both the exterior and then the interior thereof as shown and later described.

Another object of this invention is to produce a cured and finished composite member from dry filaments and all of which is accomplished from the liquid resin impregnated laminiform which is passed through a heat zone and brought to the range of temperature conducive to curing; and thereafter the heated laminiform is pulled through a sizing die where it is post cured and issues as the finished composite product. As is shown, the resin impregnated and preheated laminiform enters the post cure sizing die through preceeding carding means that assures the even distribution of the exteriormost filaments that extend longitudinally of the product surface, as in the case illustrated.

SUMMARY OF INVENTION

Referring to the drawings, it is an object to provide a laminiform product in continuous elongated lengths comprised of multi layers of fibers. It is the lay-up of filaments which is effected, wherein a plurality of uniform layers are advantageously disposed and subsequently bonded together into an integral composite. In practice, there are inner and outer layers of axially disposed filaments with an intermediate layer of transversely disposed filaments therebetween. The filaments are fed from a creel system comprised of independent reels feeding each filament to the lay-up area characterized by a mandrel anchored at its rearmost end and floating upon the lay-up as it extends forwardly. The method and apparatus of the present invention involves a dry form lay-up of the multiplicity of filaments 11 laid onto a mandrel M over the anchored end portion thereof and pulled forwardly toward the other cantilevered end thereof by traction rollers R, said dry form lay-up being performed by the apparatus means in the embodiment shown and described as follows:

The composite illustrated herein is a multi layer laminiform product involving three lay-ups $a$, $a'$ and $a''$ which are essentially alike and which are related so as to lay one over the other. The said lay-ups are established by several distinct process steps performed by lay-up means A, A', and A'' that are shown to be progressively sequential along the mandrel M and arranged so as to lay filament laminae coextensively one over the other. As shown, we provide lay-up means for each layer of filaments involved as follows: A lay-up means A for establishing an innermost lamina $a$ of longitudinally disposed filaments; a lay-up means A' for establishing an intermediate lamina $a'$ of circumferentially disposed filaments; and a lay-up means A'' for establishing an outermost lamina $a''$ of longitudinally disposed filaments. The lay-up means A and A'' are alike and in fact can be identical and each comprised of a creel system B comprised of a multiplicity of reels of individual filaments 11 such as 60 end roving, a distribution means C through which the individual filaments are evenly distributed over the surface of the mandrel, and carding means D which places and retains placement of the filaments 11 over the surface of the mandrel. The third enumerated means D above described characterizes the application of the axially disposed laminations, both inner and outer; while the intermediate lamination $a'$ inherently retains its placement and/or position and does not require a carding means D for its placement. Thus, the intermediate lay-up means is limited to a driven revolving creel system B' of individual filaments 11 such as 60 end roving and a distribution means C' through which each filament is trained onto the innermost layer of longitudinal fibers.

The dry lay-up laminiform thus far referred to is then impregnated with a liquid bonding material and preferably with a thermosetting resin material to the exclusion of air; and to this end we provide sequential outer and inner liquid impregnation means E and E' which saturate the laminiform with the resin binder and simultaneously purge all entrained fluid gases and air therefrom. The liquid resin impregnated laminiform is then passed through a heat zone F and brought to the range of temperature conducive to curing; and thereafter the heated laminform is pulled through a post cure sizing die G where it is cured and issues as the finished composite product. As shown, the resin impregnated and heated laminiform enters the heat zone F and post cure sizing die G through a preceeding carding means D' and D'' which assures the even distribution of the longitudinally extending filaments comprising the respective laminae placed thereby.

DRAWINGS

The various objects and features of this invention will be fully understood from the following detailed description of the typical preferred form and application thereof, throughout which description reference is made to the accompanying drawings, in which:

FIG. 1 is a side elevation of an apparatus embodying the present invention.

FIG. 2 is an enlarged sectional view of a portion of the apparatus, illustrating the process and means for establishing the first dry lay-up of the composite to be formed.

FIG. 5 is an enlarged sectional view of a portion of the apparatus, illustrating the process and means for establishing the third dry lay-up of the composite to be formed.

FIG. 6 is a transverse view taken as indicated by line 6—6 on FIG. 5.

FIG. 7 is a transverse view taken as indicated by line 7—7 on FIG. 2.

FIGS. 8 and 9 are enlarged transverse sectional views taken as indicated by lines 8—8 and 9—9 on FIG. 2.

FIG. 10 is an enlarged longitudinal sectional view of a portion of the apparatus shown in FIG. 1.

FIGS. 11, 12 and 13 are enlarged detailed transverse sectional views taken as indicated by lines 11—11, 12—12 and 13—13 on FIG. 10.

Figure 3:
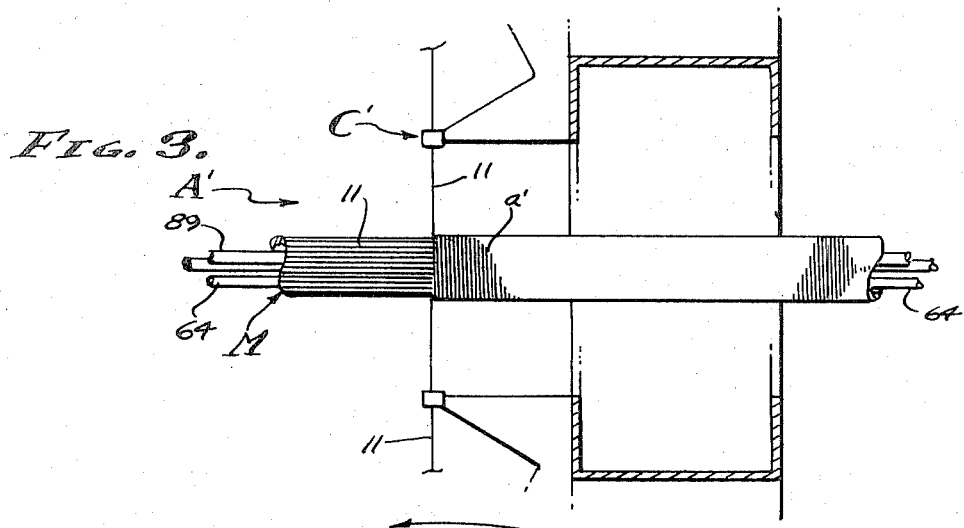
FIG. 3 is an enlarged sectional view of a portion of the apparatus, illustrating the process and means for establishing the second dry lay-up of the composite to be formed.
Figure 4:
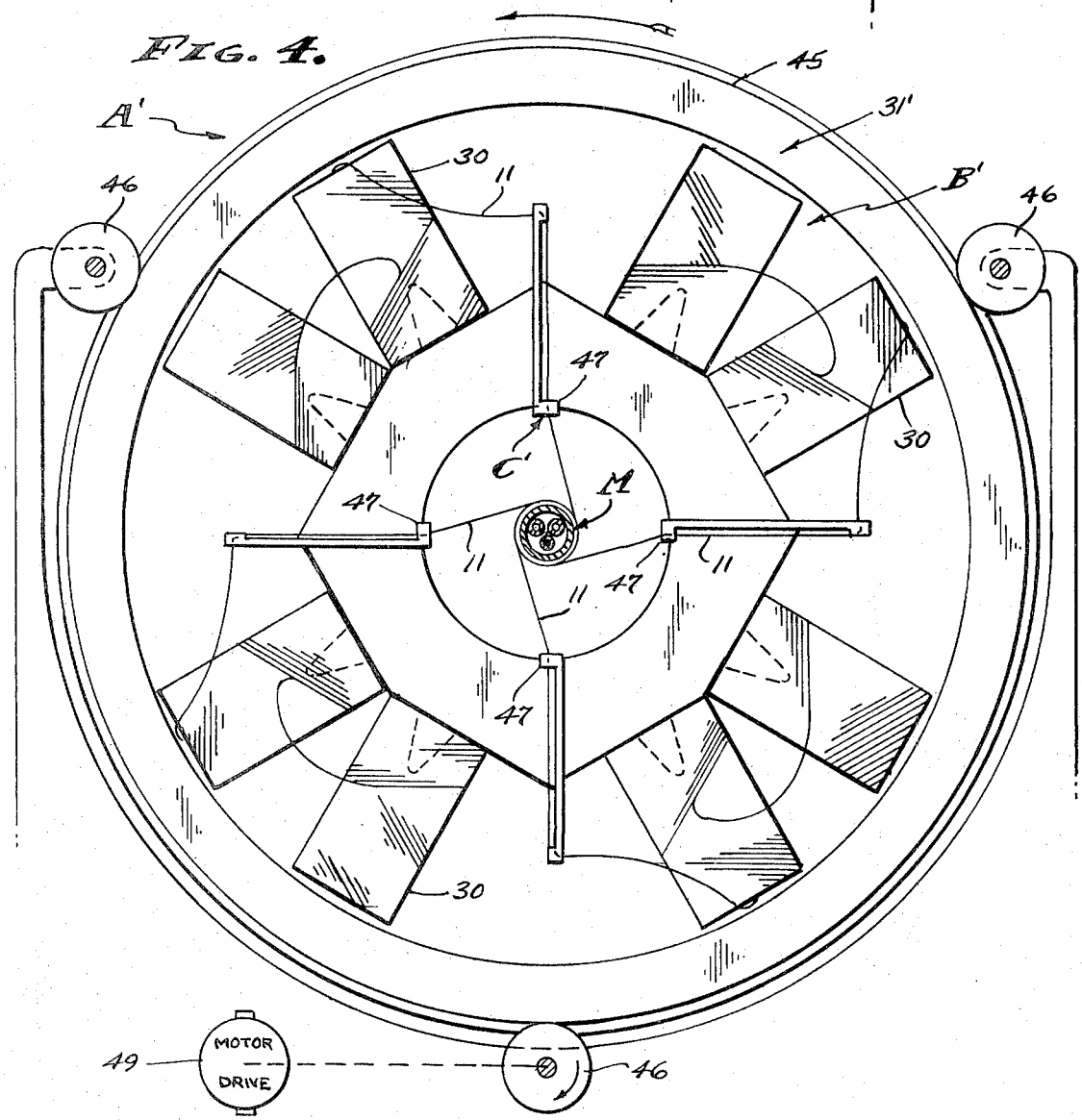
FIG. 4 is an enlarged sectional view taken as indicated by line 4—4 on FIG. 1.
Figure 14:
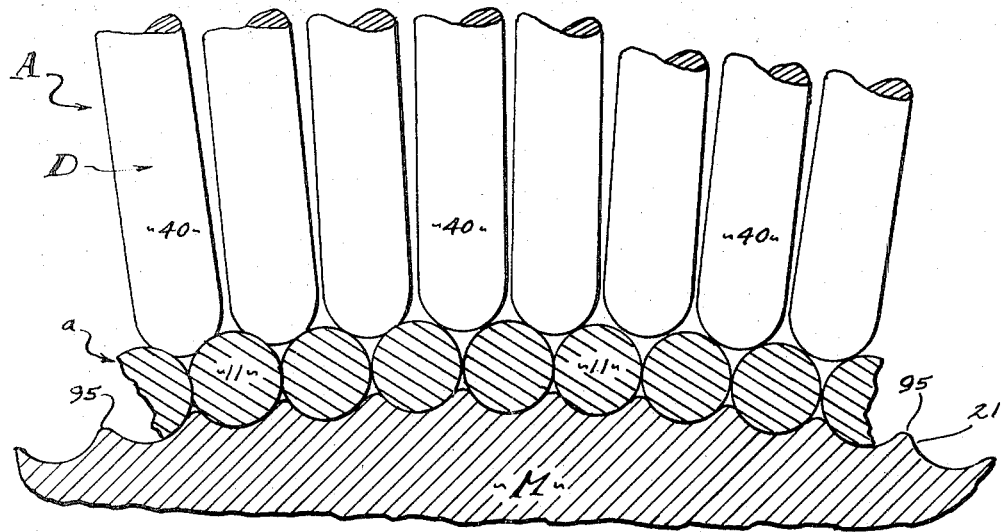
Figure 15:
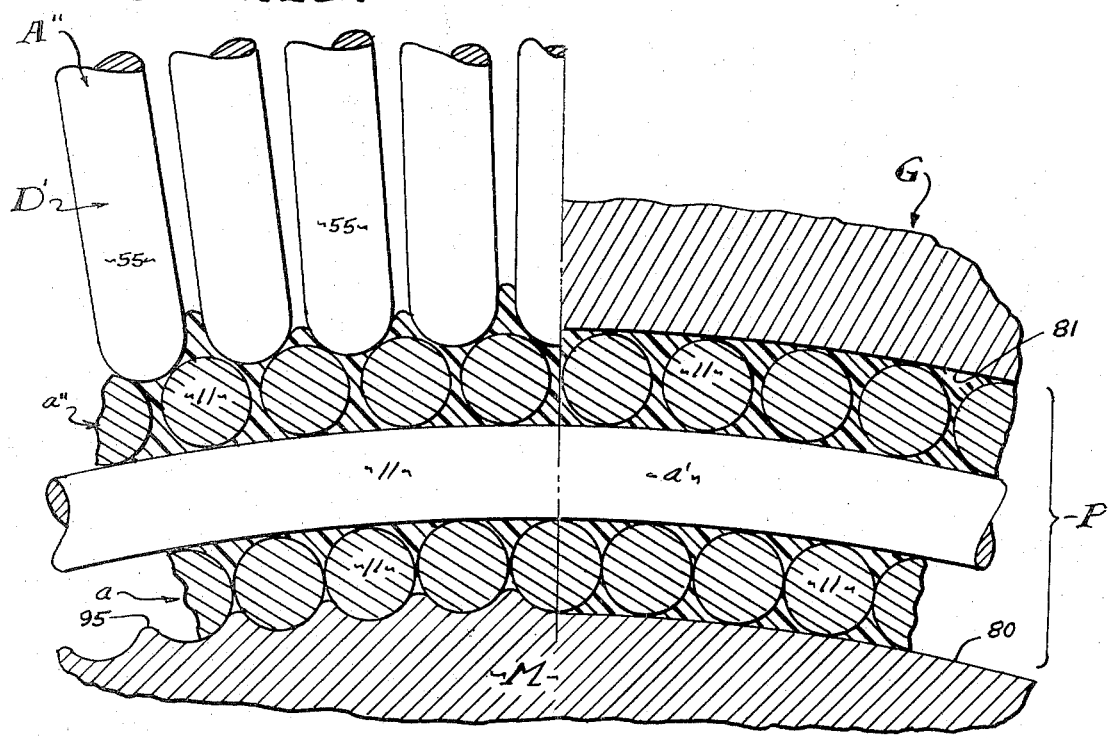

And, FIGS. 14 and 15 are enlarged detailed fragmentary views showing the characteristic cross sectional configuration of the carding means, FIG. 14 showing the dry form and carding of lay-up a, FIG. 15 showing the liquid impregnated lay-ups $a$, $a'$ and $a''$; FIG. 15 also showing the mandrel configuration to retain positioning of the laminiform and including the die forms which establish the inner and outer diameters of the finished composite product.

PREFERRED EMBODIMENT

Referring now to the drawings and to the preferred embodiment of an apparatus conducting the method of the present invention, it will be clear from FIG. 1 that the dry form lay-up of the laminiform is completed by the lay-up means A, A' and A'' prior to resin impregnation by the means E and E', followed by sizing and also curing of the composite laminiform by the means G which is separated from the preceeding pre-heating performed upon the saturated laminiform by the means F. Throughout the process and operation of the apparatus herein disclosed there is the characteristic placement and maintenance of placement effected upon the filaments involved by carding, and namely by the carding means D, D' and D'' as hereinafter described. The processing of materials is dynamic and continuously moving over and along the longitudinally coextensive mandrel M that is anchored at its one exposed end and which characteristically floats within the confines of the "fill" provided by the multi-layer laminiform, impregnated and cured thereon during the manufacture of the composite product. The method is practiced as follows, each step thereof being related herein to the preferred embodiment of the apparatus involving means A through G and other related means that will be described in conjunction therewith:

The composite product shown herein is resin impregnated glass filled pipe P that has a tubular profile and which is to be produced by a throughput process in continuous or unlimited length. The "fill" can be one or more layers of fiber in the form of multi filaments, and is shown basically as a three layer laminiform structure of alternately and circumferentially disposed filaments, for example glass fibers. It is to be understood that variations and modifications to cross sectional configuration and thickness, and to the number of filaments and material properties thereof can vary as circumstances require. In the embodiment shown, the pipe P is a nominal four inch diameter with an eighth inch wall; and its inner, intermediate and outer laminae of 0.040 inch nominal thickness in each instance. The inner and outer lamina $a$ and $a''$ are laid as longitudinally disposed fibers, while the intermediate lamina $a'$ is transversely laid as circumferentially disposed spirally wrapped fibers.

The lay-up means A, A', and A'' are longitudinally separated so as to lay filaments onto the mandrel M at sequential stations therealong, and they are essentially alike insofar as each includes a creel system B and a filament distribution means C. However, the lay-up means A and A'' involve the additional carding means D and D' which establish and maintain orientation of the filaments that are laid thereby onto the mandrel M that is fixed to a bed 15 by means of a standard 20 at the back end of the pultrusion machine. The mandrel M is supportably anchored on an axis spaced above the bed 15 and is adapted to float horizontally as it is cantilevered and thereby extends forwardly in parallelism above the bed and coextensively with the process means to cooperate therewith as will be described. The mandrel M is tubular with an outer diameter wall 21 establishing the inner diameter of pipe P and with an open interior extending therethrough to pass liquid ducts for the delivery and return of fluids involved in the process and operation of the apparatus. Further, the mandrel M is sectional, involving a forming or lay-up section 22, an impregnation section 23, a pre-heat section 24, and a post cure section 25; all of which are cooperatively related to process means as hereinafter described.

The method involves the sequential dry form lay-up of one or more laminae such as for example the lamina $a$, $a'$ and $a''$ as is shown and as will be described. Each lamina is comprised of a multiplicity of filaments 11 held in uniform spaced relationship surrounding the mandrel M by the distribution means C and said uniform spacing maintained by the carding means D and D' during the subsequent laying of said filaments onto the mandrel, or over the next preceeding lamina as the case may be. The filaments are furnished from a multiplicity of reels 30 carried in racks 31 positioned laterally of or rearward of the machine bed 15 and preferably in alignment with the axis of mandrel M. The reels 30 of filaments 11 and their arrangement in the racks 31 comprises the creel systems B of the lay-up means A, A', and A''0 and are varied as circumstances require. As shown, the racks 31 of lay-up means A and A'' are static while the rack 31' of lay-up means A' is dynamic or moving. Further, the number of filaments is numerous with lay-up means A and A'', while fewer with lay-up means A'; all according to the requirements of the composite product to be formed.

Referring now to the lay-up means A, the first two steps of the method are performed thereby and which involve the distribution means C and carding means D positioned one ahead of the other forwardly of the standard 20 that supports the mandrel M and by which the first two steps of the method are performed. In accordance with this method, the composite configuration is established by the form over which it is shaped and in this case a tubular mandrel M. However, it is to be understood that composite end products of open sides configuration can involve one or more faces of a mandrel and onto which the filaments are laid. In the case illustrated, the finished product is glass filled resin impregnated plastic pipe, in which case the mandrel has the cylindrical exterior 21 onto which a layer of filaments 11 are laid.

The distribution means C performs the first method step and comprises a ring 35 that is spaced from and surrounds the mandrel M immediately forward of the standard support 20 therefor, and a series of circumferentially spaced filament guides 36. The ring 35 is supported by a standard 37 and each guide 36 passes a filament 11 from the creel system B supplying the same. The guides 36 can vary in design and basically can be eyelets through which the filaments are threaded so as to be drawn forwardly from the individual reels 30 and onto the moving composite or laminiform.

The carding means D performs the second method step and comprises a comb 40 or the like that engageably surrounds the mandrel M forward of the distribution means C above described. The carding means D can vary in design and the comb 40 thereof can be a series of circumferentially spaced fins, teeth, rods or bristles, and preferably closely spaced fins or bristles which penetrate into engagement between the filaments laid thereby onto the cylindrical exterior 21 of the mandrel. Alignment with the comb 40 of means D is initially established by a guide ring 38 and into which the filaments are funneled onto the exterior 21 of mandrel M. The comb 40 is supported by a standard 41 and the fins or bristles thereof direct the filaments 11, as is shown. The comb 40 closely surrounds the mandrel M so as to brush the filament of lamina $a$ into support with the cylindrical exterior 21 thereof.

Referring now to the lay-up means A', the third step of the method is performed thereby and which involves movement and in this case revolvement of the creel system B' which supplies one or more filaments 11 to distribution means C' thereof. The distribution means C' and creel system B' supplying filament thereto are rotatably carried by a revolving rack 31' that surrounds the mandrel M and the lamina $a$ previously laid thereon. The rack 31' is essentially a wheel rotatable on an axis coincidental with the axis of mandrel M and having a circular perimeter 45 that has supported and guided engagement upon rollers 46 and one of which is driven by a motor 49. The wheel-shaped rack 31' of means B' is of substantial diameter and carries at least one reel 30 from which a filament 11 can be withdrawn and passed through a guide 47 of means C' and onto the moving composite or laminiform. As shown, there are four reels and guides 47, the guides 47 being disposed so that filaments can be threaded therethrough and paid out tangentially onto the periphery of mandrel M as a wrapping over the lamina $a$. The closeness and/or density of filaments 11 in lamina $a'$ is determined by the rotational speed of the wheel shaped rack 31' as related to the forward movement of the composite being formed. And, the tightness of the wrapping which establishes lamina $a'$ is determined by the restriction established in issuing the filaments from and through the reels 30 and guides 47 respectively. The filaments 11 of lamina $a'$ are laid contiguously side by side as they spirally progress along the dry laminiform.

The fourth method step is performed by the distribution means C of the lay-up means A'' which comprises a ring 50 that is spaced from and surrounds the mandrel M forward of the revolving wheel device of the lay-up means A', and a series of circumferentially spaced filament guides 51 carried thereby. The ring is supported by a standard 52 and each guide 51 passes a filament from the creel system B. AS shown, the supply of filaments 11 is lateral of the mandrel M, and accordingly the ring 50 is disposed in a plane to bisect the included angle of the filaments relative to the mandrel axis, substantially as shown; it being understood that the lateral angle of the filament 11 feeding through the guides 51 can vary and that the ring 50 can be a modified circular member fixedly positioned on a standard 52. The guides 51 can vary in design and basically can be eyelets through which the filaments are threaded so as to be drawn forwardly from the individual reels 30 and onto the moving composite laminiform.

The fifth method step is performed by the carding means D' of the lay-up means A'' which comprises a comb 55 or the like that engageably surrounds the mandrel M forward of the preceeding distribution means C of said means A''. The carding means can vary in design (the same as the corresponding means hereinabove described) and the comb 55 thereof can be a series of circumferentially spaced fins, teeth, rods or bristles, and preferably closely spaced fins or bristles which penetrate into and between the filaments laid thereby onto the cylindrical exterior of the laminiform. Alignment with comb 55 of means D' is initially established by a guide ring 50 and into which the filaments are funneled onto the lay-up $a'$ of mandrel M. The comb 55 is supported by means E–E' and the fins or bristles thereof direct the filaments 11 as is shown. The comb 55 closely surrounds the mandrel M so as to brush the filaments into support upon the cylindrical exterior of the intermediate lamina $a'$ of the moving composite laminiform. Thus, the filaments 11 of lamina $a''$ are laid contiguously side by side longitudinally of the dry laminform.

From the foregoing it will be seen that the method provides a dry laminiform laid onto the lay-up section 22 of the mandrel and which according to this invention is next saturated with resin applied over and through the impregnation section 23 of the mandrel. The resin supply means S is provided for this next step of the process and which involves, generally, a resin tank 62 in which a supply thereof is maintained, and a pressure regulated pump 63. A delivery pipe 64 extends from the output of pump means 63 which branches into the means E and E', and with a return pipe 65 to the resin tank 62 for recycling.

Referring now to the sixth and seventh steps of the method and to the impregnation means E and E' it is a feature of this method and apparatus to simultaneously saturate or purge the multi filament laminiform; by sequentially pressurizing liquid resin into the laminiform wall from the exterior and then the interior thereof. To this end we provide a sleeve 66 concentrically surrounding the mandrel M to slideably engage the composite laminiform that moves forwardly therethrough, and a manifold 67 encompassing the sleeve. The manifold 67 receives resin under pressure from delivery pipe 64 and the sleeve 66 is perforated so as to discharge resin into the exterior of the composite laminiform. The sleeve 66 is located forward of the preceeding carding means D' of lay-up means A'' and proceeds to saturate the composite from its exterior surface. The impregnation section 23 of the mandrel M immediately forward of the sleeve 66 is perforated and surrounds a manifold 68 that receives resin from supply pipe 64 so as to discharge resin into the interior of the composite laminiform. The resin applied through sleeve 66 displaces air forwardly through the filaments, while the resin applied through the mandrel wall displaces any entrained gas radially and outward therefrom. In practice, the sleeve 66 is extended forwardly so as to surround and encompass the manifold 68 leaving an annulus which freely passes the composite laminiform in its saturated condition, permitting the radial and forward discharge of gases therefrom.

The eighth step of the method involves the heat zone F and pre-heating of the resin saturated laminiform, preferably by means of dielectric heating employing Radio Frequency energy applied within the limits of the pre-heat section 24 of the mandrel M. Heating of this type involves the use of electrically non-conductive materials in the construction of the parts and elements closely associated with the heat zone, and accordingly the section 24 of mandrel M is made of dielectric material such as, for example, silicon fiberglas with a teflon coating. As shown, the dielectric section 24 is coupled into the mandrel M between the impregnation section 23 and the curing section 25, and is open through its interior for the passage of fluid ducts therethrough. In accordance with this invention, electrodes are provided for the induction of heat into the resin saturated laminiform and which involves, generally, the electrodes D1 and D2 coupled to the output conductors of a Radio Frequency generator 71. Each of the said electrodes involves one or more split rings 72 that embrace the laminiform as it progresses over the pre-heat section 24. As shown, the electrodes D1 and D2 are alike with the separations thereof occuring along one side of the grouping made up of alternately spaced rings disposed in planes normal to the axis of the mandrel and each electrode having an inner diameter substantially spaced from the outside diameter of the laminiform being preheated. The Radio Frequency generator 71 produces up to 8KW at 70MHz and to the end that a temperature in the range of 120° F. is attained in the saturated laminiform while moving forwardly at the rate of eight foot per minute in processing the four inch pipe as specified.

The ninth step of the method is performed by the carding means D'' which comprises a comb 75 or the like that engageably surrounds the mandrel M forward of the preceeding heat zone G. The carding means can vary in design (the same as the two corresponding means hereinabove described) and the comb 75 thereof can be a series of circumferentially spaced fins, teeth, rods or bristles, and preferably closely spaced fins or bristles which penetrate into and between the filaments previously laid onto the cylindrical exterior of the laminiform. The depth of penetration of said bristles is limited and the purpose thereof is to maintain the parallelism and the contiguity of filaments 11 in the span between means D' and post cure means G next to be described. The comb 75 is supported by means G and the bristles thereof direct the filaments as is shown. The comb 75 closely surrounds the mandrel M so as to brush the filaments supported upon the cylindrical exterior of the intermediate lamina $a'$ of the moving composite laminiform. Thus, the filaments 11 of lamina $a''$ are prevented from being displaced.

The tenth and final step of this throughput method involves sizing and curing of the resin impregnated and pre-heated laminiform. It is significant that the forwardly advancing laminiform is supported by the post cure sizing die G and in turn supports the curing section 25 of mandrel M; the said mandrel and laminiform laid thereon being cantilevered forwardly from the standard 20 and floating on the dry laminae "fill" confined and then impregnated within the sleeve 66 of means E–E'. The post cure sizing die G cooperates with the post cure section 25 of the mandrel M to establish a cylindrical annulus for accurately forming the inside and outside diameters of the finished composite product in the form of the pipe P. The post cure section 25 has an outer cylinder wall 80 accurately formed to the inside diameter of the finished composite article, while the die G has an inner cylinder wall 81 accurately formed to the outside diameter of the finished composite article. Thus, the resin impregnated laminiform held in a uniform cross sectional configuration established and maintained by the carding means D, D' and D'' is consequently cured to a uniform wall thickness.

Heat is applied to the laminiform through the said outer and inner cylinder walls 80 and 81 while the said laminiform is advanced through the post cure section 25 at a maximum rate, and to these ends the walls 80 and 81 are smooth metallic walls, for example polished chrome plated walls. The cure temperature applied through the walls is up to 250–400° F., which is a substantial increase over the pre-heat ambient temperature of 120° F., a curing temperature being selected for the particular epoxy resin involved so as to take full advantage of the differential time factor as related to the Temperature-Time cure determined by a maximum rate of travel coordinated with an optimum temperature.

The post cure sizing die G and mandrel section 25 are electrically heated and liquid heated respectively, and preferably the latter. Conductive components are permissive in the die G (thermostatically controlled) while the pre-heat section 24 requires the transmission of heat energy through electrically non-conductive means; and to this end fluidics is employed to heat the curing section 25 of the mandrel and which comprises a fluid heat conductor 85 such as oil recirculated through a manifold 86 within the section 25 from an external tank 87 that is electrically heated (thermostatically controlled), all as shown. With the present invention, the heated fluid 85 from tank 87 is recirculated by a suitable pump 88 through lines 89 which are dielectric and/or electrically non-conductive throughout the pre-heating zone F of mandrel section 24. As the sizing diameter 80 receives the laminiform for curing, the excessive resin is wiped therefrom at the entrance to the sizing die G and drops therefrom into the tray 90 for return to tank 62.

In accordance with this invention, floatation and/or sinking of the filaments is prevented by providing the carding means D, D' and D'', so that displacement of the filaments cannot occur. The pultrusion process involves pulling of the filaments 11 by the traction rollers R with resultant advanced or forward transport of the lay-up and finished composite, and to the end that wetted filaments are under tension as they are drawn from the creel systems B and B'. Since lengthy spans of unsupported filaments will result in sagging or displacement due to floatation, closely spaced support is provided therefor in the frequency of the said carding means, thereby carrying the laminae insofar as they are engageable from the exterior by said means. Corresponding interior support is provided for lamina a as it slides over the outer diameter wall 21 of mandrel M which is also provided with carding means in the form of fins 95 that project radially therefrom and extend longitudinally of mandrel sections 22, 23 and 24. The fins 95 can be continuous or interrupted as circumstances require and carry the innermost filaments 11 to thereby give substantial support to lamina a. Consequently, the interior and exterior laminae a and a'' are carried in their dry form and resin saturated condition throughout the processing sections 22, 23, and 24 of the mandrel.

From the foregoing it will be apparent that we have provided a method and apparatus for pultruding uniform sections of composite members comprised of filaments subsequently joined into an integral article by a resin binder. The filaments are drawn onto the mandrel for support and are retained in properly oriented positions by carding means for ultimate encapsulation within a solidified body retaining the accurate cross sectional formation as is predetermined by the laminae thicknesses initially established with the carding means which characterized the method and process involved in the operation of the apparatus as it is hereinabove shown and described.

Having described only typical preferred forms and applications of our invention, we do not wish to be limited or restricted to the specific details herein set forth, but wish to reserve to ourselves any modifications or variations that may appear to those skilled in the art:

We claim:

1. The method of forming a lamina of impregnated and cured continuous unlimited length composite, and including; anchoring the one rear end of an elongated mandrel having a cross section including a configuration to establish the inner profile of the composite, distributing dry substantially parallel filaments into supported engagement upon said mandrel configuration, carding the filaments in a uniform layer contiguously combed upon the said mandrel configuration, then impregnating the layer of parallel filaments placed contiguously upon the said mandrel configuration with liquid material, drawing the liquid impregnated and placed layer of filaments through a die configuration opposed to said mandrel configuration to establish the outer profile of the composite and simultaneously curing the same into a finished article comprising the said composite, and advancing the finished article comprising the said composite and thereby drawing the dry lay-up of filaments through said aforsaid distributing, combing, impregnating, and subsequent sizing and curing steps.

2. The method of producing an unlimited length composite article as set forth in claim 1 wherein said carding is performed at least at one of said profiles to comb and support the layer of parallel filaments.

3. The method of producing an unlimited length composite article as set forth in claim 1 wherein said carding is performed at both the inner and outer profiles to comb and support the layer of parallel filaments.

4. The method of producing an unlimited length composite article as set forth in claim 1 wherein said carding is performed at spaced intervals preceeding the step of sizing and curing, to thereby comb and support the layer of parallel filaments contiguously upon said mandrel.

5. The method of producing an unlimited length composite article as set forth in claim 1 wherein said carding is performed at spaced intervals at both the inner and outer profiles to comb and support the layer of parallel filaments.

6. The method of producing an unlimited length composite article as set forth in claim 1 wherein said impregnating after carding is by pressure application of said liquid material into the layer of parallel filaments at least at one of said profiles thereof.

7. The method of producing an unlimited length composite article as set forth in claim 1 wherein said impregnating after carding is by sequential application of said liquid material into the layer of parallel filaments at one profile and then the other thereof.

8. The method of producing an unlimited length composite article as set forth in claim 1 wherein said impregnating after carding is by sequential application of said liquid material into the layer of parallel filaments at the outer profile and then the inner profile thereof.

9. The method of forming a multi lamina of impregnated and cured continuous length composite, and including; anchoring the one rear end of an elongated mandrel having a cross section including a configuration to establish the inner profile of the composite, distributing dry substantially parallel filaments longitudinally into supported engagement upon said mandrel configuration, and carding the first mentioned filaments in a uniform layer contiguously combed upon the said mandrel configuration, distributing dry substantially parallel filaments transversely over said mandrel and first mentioned layer of filaments thereon, and laying the second mentioned filaments in a layer placed contiguously onto said first mentioned layer of filaments, then impregnating the two aforsaid layers with liquid material, drawing the liquid impregnated and placed filaments through a die configuration surrounding and opposed to said mandrel configuration to establish the outer profile of the composite and simultaneously curing the same into a finished article comprising the said composite, and advancing the finished article comprising the composite and thereby drawing the multi lamina lay-up of filaments through said aforsaid distributing, combing, impregnating, and subsequent sizing and curing steps.

10. The method of producing an unlimited length multi lamina as set forth in claim 9 wherein said carding is performed at the inner profile to comb and support the longitudinally disposed layer of parallel filaments.

11. The method of producing an unlimited length multi lamina as set forth in claim 9 wherein said carding is performed at spaced intervals preceeding the step of sizing and curing, to thereby comb and support the longitudinally disposed layer of parallel filaments.

12. The method of producing an unlimited length multi lamina as set forth in claim 9 wherein said impregnating after carding is by pressure application of said liquid material into the longitudinally disposed layer of parallel filaments at least at one of said profiles thereof.

13. The method of producing an unlimited length multi lamina as set forth in claim 9 wherein said impregnating after carding is by sequential application of said liquid material into the layer of parallel filaments at one profile and then the other thereof.

14. The method of producing an unlimited length multi lamina as set forth in claim 9 wherein said impregnating after carding is by sequential application of said liquid material into the two layers of filaments at the outer profile and then the inner profile of the composite.

15. The method of forming a multi lamina of impregnated and cured continuous length composite, and including; anchoring the one rear end of an elongated mandrel having a cross section including a configuration to establish the inner profile of the composite, distributing dry substantially parallel filaments longitudinally into supported engagement upon said mandrel configuration, and carding the first mentioned filaments in a uniform layer contiguously combed upon the said mandrel configuration, distributing dry substantially parallel filaments transversely over said mandrel and first mentioned layer of filaments thereon, and laying the second mentioned filaments in a layer placed contiguously onto said first mentioned layer of filaments, distributing dry substantially parallel filaments longitudinally into supported engagement upon the second mentioned layer of filaments, and carding the third mentioned filaments in a uniform layer contiguously combed upon second mentioned layer of filaments, then impregnating the three aforsaid layers with liquid material, drawing the liquid impregnated and placed filaments through a die configuration opposed to said mandrel configuration to establish the outer profile of the composite and simultaneously curing the same into a finished article comprising the said composite, and advancing the finished article comprising the composite and thereby drawing the multi lamina lay-up of filaments through said aforsaid distributing, combing, impregnating, and subsequent sizing and curing steps.

16. The method of producing an unlimited length multi layer lamina as set forth in claim 15 wherein said carding is performed at least at one of said profiles to comb and support a layer of longitudinally disposed filaments.

17. The method of producing an unlimited length multi layer lamina as set forth in claim 15 wherein said carding is performed at both the inner and outer profiles to comb and support the first and third mentioned layers of parallel filaments.

18. The method of producing an unlimited length multi layer lamina as set forth in claim 15 wherein said carding is performed at spaced intervals preceeding the step of sizing and curing, to thereby comb and support a layer of longitudinally disposed parallel filaments.

19. The method of producing an unlimited length multi layer lamina as set forth in claim 15 wherein said carding is performed at spaced intervals at both the inner and outer profiles to comb and support the first and third layers of longitudinally disposed parallel filaments.

20. The method of producing an unlimited length multi layer lamina as set forth in claim 15 wherein said impregnating after carding is by pressure application of said liquid material into a layer of longitudinally disposed parallel filaments at least at one of said profiles thereof.

21. The method of producing an unlimited length multi layer lamina as set forth in claim 15 wherein said impregnating after carding is by sequential application of said liquid material into the longitudinally disposed parallel filaments at one profile and then the other thereof.

22. The method of producing an unlimited length multi layer lamina as set forth in claim 15 wherein said impregnating after carding is by sequential application of said liquid material into the longitudinally disposed parallel filaments at the outer profile and then the inner profile thereof.

23. The method of forming a tubular lamina of impregnated and cured continuous length composite, and including; anchoring the one rear end of an elongated mandrel having a cross section configuration establishing the interior profile of the composite, distributing dry substantially parallel filaments longitudinally into supported engagement upon said mandrel configuration, and carding the first mentioned filaments in a uniform layer contiguously combed upon the said mandrel configuration, distributing dry substantially parallel filaments circumferentially around said mandrel and first mentioned layer of filaments thereon, and laying the second mentioned filaments in a layer placed contiguously onto and supported by said first mentioned layer of filaments, then impregnating the two aforsaid layers with liquid material, drawing the liquid impregnated and placed filaments through a die configuration opposed to said mandrel configuration to establish the exterior profile of the composite and simultaneously curing the same into a finished article comprising the said composite, and advancing the finished article comprising the composite and thereby drawing the multi lamina lay-up of filaments through said aforsaid distributing, combing, impregnating, and subsequent sizing and curing steps.

24. The method of producing an unlimited length tubular multi lamina as set forth in claim 23 wherein said carding is performed at the interior profile to comb and support the longitudinally disposed layer of parallel filaments.

25. The method of producing an unlimited length tubular multi lamina as set forth in claim 23 wherein said carding is performed at spaced intervals preceeding the step of sizing and curing, to thereby combed and support the longitudinally disposed layer of parallel filaments.

26. The method of producing an unlimited length tubular multi lamina as set forth in claim 23 wherein said impregnating after carding is by pressure application of said liquid material into the longitudinally disposed layer of parallel filaments at least at one of said profiles thereof.

27. The method of producing an unlimited length tubular multi lamina as set forth in claim 23 wherein said impregnating after carding is by sequential application of said liquid material into the layer of parallel filaments at one profile and then the other thereof.

28. The method of producing an unlimited length tubular multi lamina as set forth in claim 23 wherein said impregnating after cording is by sequential application of said liquid material into the two layers of filaments at the outer profile and then the interior profile of the composite.

29. The method of forming a tubular multi layer lamina of impregnated and cured continuous length composite, and including; anchoring the one rear end of an elongated mandrel having a cross sectional configuration establishing the interior profile of the composite, distributing dry substantially parallel filaments longitudinally into supported engagement upon said mandrel configuration, and carding the first mentioned filaments in a uniform layer contiguously combed upon the said mandrel configuration, distributing dry substantially parallel filaments circumferentially around said mandrel and first mentioned layer of filaments thereon, and laying the second mentioned filaments in a layer placed contiguously onto the first mentioned layer of filaments, distributing dry substantially parallel filaments longitudinally into supported engagement upon the second mentioned layer of filaments, and carding the third mentioned filaments in a uniform layer contiguously combed upon said second mentioned layer of filaments, then impregnating the three aforsaid layers with liquid material, drawing the liquid impregnated and placed filaments through a die configuration opposed to said mandrel configuration to establish the exterior profile of the composite and simultaneously curing the same into a finished article comprising the said composite, and advancing the finished article comprising the composite and thereby drawing the multi lamina lay-up of filaments through said aforsaid distributing, combing, impregnating, and subsequent sizing and curing steps.

30. The method of producing an unlimited length tubular multi layer lamina as set forth in claim 29 wherein said carding is performed at least at one of said profiles to comb and support a layer of longitudinally disposed filaments.

31. The method of producing an unlimited length tubular multi layer lamina as set forth in claim 29 wherein said carding is performed at both the interior and exterior profiles to comb and support the first and third mentioned layers of parallel filaments.

32. The method of producing an unlimited length tubular multi layer lamina as set forth in claim 29 wherein said carding is performed at spaced intervals preceeding the step of sizing and curing, to thereby comb and support a layer of longitudinally disposed parallel filaments.

33. The method of producing an unlimited length tubular multi layer lamina as set forth in claim 29 wherein said carding is performed at spaced intervals at both the interior and exterior profiles to comb and support the first and third layers of longitudinally disposed parallel filaments.

34. The method of producing an unlimited length tubular multi layer lamina as set forth in claim 29 wherein said impregnating after carding is by pressure application of said liquid material into a layer of longitudinally disposed parallel filaments at least at one of said profiles thereof.

35. The method of producing an unlimited length tubular multi layer lamina as set forth in claim 29 wherein said impregnating after carding is by sequential application of said liquid material into the longitudinally disposed parallel filaments at one profile and then the other thereof.

36. The method of producing an unlimited length tubular multi layer lamina as set forth in claim 29 wherein said impregnating after carding is by sequential application of said liquid material into the longitudinally disposed parallel filaments at the exterior profile and then the interior profile thereof.

37. Apparatus for forming an impregnated and cured continuous unlimited length lamina composite, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, the mandrel having an impregnation section forward of said lay-up section and impregnating means saturating the layer of filaments with curable liquid material throughout said cross section, and the mandrel having a curing section forward of said impregnation section and over which the saturated lamina is continuously advanced by said traction means and cured.

38. The apparatus for the formation of unlimited length lamina composite as set forth in claim 37 wherein said carding means engages and combs the layer of filaments at spaced intervals along the mandrel preceeding the curing section thereof.

39. The apparatus for the formation of unlimited length lamina composite as set forth in claim 37 wherein said carding means engages and combs the layer of filaments at spaced intervals from both the mandrel configuration and from the exterior thereof.

40. The apparatus for the formation of unlimited length lamina composite as set forth in claim 37 wherein said impregnating means discharges said liquid material from the inner profile configuration of the mandrel and into the layer of filaments thereon.

41. Apparatus for forming an impregnated and cured continuous unlimited length lamina composite of uniform profile, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, the mandrel having an impregnation section forward of said lay-up section and impregnating means saturating the layer of filaments with curable liquid material throughout said cross section, and the mandrel having a sizing and curing section forward of said impregnation section and a sizing and curing die having a cross section including a configuration opposed to the first mentioned configuration of the mandrel to establish the outer profile of the composite, the composite comprising the liquid impregnated previously dry lay-up being advanced by said traction means through a determined space between the mandrel and said sizing and curing die.

42. The apparatus for the formation of unlimited length uniform profile lamina composite as set forth in claim 41 wherein said carding means engages and combs the layer of filaments at the inner and outer profiles respectively.

43. The apparatus for the formation of unlimited length uniform profile lamina composite as set forth in claim 41 wherein said carding means engages and combs the layer of filaments at spaced intervals along the mandrel preceeding the curing section thereof.

44. The apparatus for the formation of unlimited length uniform profile lamina composite as set forth in claim 41 wherein said carding means engages and combs the layer of filaments at spaced intervals from both the mandrel configuration and from the exterior thereof.

45. The apparatus for the formation of unlimited length uniform profile lamina composite as set forth in claim 41 wherein said impregnating means discharges said material from the inner profile and configuration of the mandrel and into the layer of filaments thereon.

46. The apparatus for the formation of unlimited length uniform profile lamina composite as set forth in claim 41 wherein said impregnating means sequentially discharges said liquid material into the layer of parallel filaments at the outer profile and then the inner profile thereof.

47. Apparatus for forming an impregnated and cured continuous unlimited length multi lamina composite, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation over said lay-up section and laying the said second mentioned filaments contiguously upon the first mentioned layer of filaments, the mandrel having an impregnation section forward of said lay-up section and impregnating means saturating the layers of filaments with curable liquid material throughout said cross section, and the mandrel having a curing section forward of said impregnation section and over which the saturated lamina is continuously advanced and cured.

48. The apparatus for the formation of unlimited length uniform profile multi lamina composite as set forth in claim 47 wherein said carding means engages and combs the first mentioned layer of filaments at spaced intervals along the mandrel preceeding the curing section thereof.

49. The apparatus for the formation of unlimited length uniform profile multi lamina composite as set forth in claim 47 wherein said impregnating means discharges said liquid material from the inner profile configuration of the mandrel and into the layers of filaments thereon.

50. Apparatus for forming an impregnated and cured continuous unlimited length multi lamina composite, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation over said lay-up section and laying the said second mentioned filaments contiguously upon the first mentioned layer of filaments, and a third distributing means receiving a multiplicity of filaments from a supply thereof and arranging the same in substantially parallel longitudinal formation said lay-up section, and carding means forward of the last mentioned distributing means and engaging the arrangement of filaments while laying the same contiguously combed onto the second mentioned layer of filaments, the mandrel having an impregnation section forward of said lay-up section and impregnating means saturating the layers of filaments with curable liquid material throughout said cross section, and the mandrel having a curing section forward of said impregnation section and over which the saturated lamina is continuously advanced and cured.

51. The apparatus for the formation of unlimited length multi lamina composite as set forth in claim 50 wherein said carding means engages and combs one of the layers of filaments at spaced intervals along the mandrel preceeding the curing section thereof.

52. The apparatus for the formation of unlimited length multi lamina composite as set forth in claim 50 wherein said impregnating means discharges said liquid material from the inner profile configuration of the mandrel and into the layers of filaments thereon.

53. The apparatus for the formation of unlimited length multi lamina composite as set forth in claim 50 wherein said impregnating means sequentially discharges said liquid material from the exterior of the layers of filaments and then from the inner profile configuration of the mandrel and into the layers of filaments thereon.

54. Apparatus for forming an impregnated and cured continuous unlimited length multi lamina composite of uniform profile, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation over said lay-up section and laying the said second mentioned filaments contiguously upon the first mentioned layer of filaments, the mandrel having an impregnation section forward of said lay-up section and impregnating means saturating the layers of filaments with curable liquid material throughout said cross section, and the mandrel having a sizing and curing section forward of said impregnation section and a sizing and curing die having a cross section including a configuration opposed to the first mentioned configuration of the mandrel to establish the outer profile of the composite, the composite comprising the liquid impregnated previously dry lay-up being advanced by said traction means through a determined space between the mandrel and said sizing and curing die.

55. The apparatus for the formation of unlimited length uniform profile multi lamina composite as set forth in claim 54 wherein said carding means engages and combs one of the layers of filaments at spaced intervals along the mandrel preceeding the sizing and curing section thereof.

56. The apparatus for the formation of unlimited length uniform profile multi lamina composite as set forth in claim 54 wherein said impregnating means discharges said liquid material from the inner profile configuration of the mandrel and into the layers of filaments thereon.

57. The apparatus for the formation of unlimited length uniform profile multi lamina composite as set forth in claim 54 wherein said impregnating means sequentially discharges said liquid material from the exterior of the layers of filaments and then from the inner profile configuration of the mandrel and into the layers of filaments thereon.

58. Apparatus for forming an impregnated and cured continuous unlimited length multi lamina composite of uniform profile, and including; an elongated bed with an anchor at its one rear end and with traction means at its front end continuously advancing the composite, an elongated mandrel extending parallel to the bed and with its one rear end fixed to said anchor and having a cross section including a configuration to establish the inner profile of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation over said lay-up section and laying the said second mentioned filaments contiguously upon the first mentioned layer of filaments, and a third distributing means receiving a multiplicity of filaments from a supply thereof and arranging the same in substantially parallel longitudinal formation supported upon said lay-up section, and carding means forward of the last mentioned distributing means and engaging the arrangement of filaments while laying the same contiguously combed upon the second mentioned layer of filaments, the mandrel having an impregnation section forward of said lay-up section and impregnating means saturating the layers of filaments with curable liquid material throughout said cross section, and the mandrel having a sizing and curing section forward of said impregnation section and a sizing and curing die having a cross section including a configuration opposed to the first configuration of the mandrel to establish the outer profile of the composite, the composite comprising the liquid impregnated previously dry lay-up being advanced by said traction means through a determined space between the mandrel and said sizing and curing die.

59. The apparatus for the formation of unlimited length uniform profile multi lamina composite as set forth in claim 58 wherein said carding means engages and combs one of the layers of filaments at spaced intervals along the mandrel proceeding the curing section thereof.

60. The apparatus for the formation of unlimited length uniform profile multi lamina composite as set forth in claim 58 wherein said impregnating means discharges said liquid material from the inner profile configuration of the mandrel and into the layers of filaments thereon.

61. The apparatus for the formation of unlimited length uniform profile multi lamina composite as set forth in claim 58 wherein said impregnating means sequentially discharges said liquid material from the exterior of the layers of filaments and then from the inner profile configuration of the mandrel and into the layers of filaments thereon.

62. Apparatus for forming a tubular impregnated and cured continuous unlimited length lamina composite of uniform profile, and including; an elongated bed with an anchor at its one rear end and with traction means at its front end continuously advancing the composite, an elongated mandrel extending parallel to the bed and with its one rear end fixed to said anchor and having a cross section configuration establishing the interior profile of the composite, the mandrel having a lay-up section forward of said anchor and distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, the mandrel having an impregnation section forward of said lay-up section and impregnating means saturating the layer of filaments with curable liquid material throughout said cross section, and the mandrel having a sizing and curing section forward of said impregnation section and a sizing and curing die having a cross section configuration uniformly spaced from and surrounding the first mentioned configuration of the mandrel to establish the wall thickness and outer profile of the composite, the composite comprising the liquid impregnated previously dry lay-up being advanced by said traction means through a determined space between the mandrel and said sizing and curing die.

63. The apparatus for forming a tubular impregnated and unlimited length uniform profile lamina as set forth in claim 62 wherein said carding means engages and combs the layer of filaments at the inner and outer profiles respectively.

64. The apparatus for forming a tubular impregnated and unlimited length uniform profile lamina as set forth in claim 62 wherein said carding means engages and combs the layer of filaments at spaced intervals along the mandrel preceeding the curing section thereof.

65. The apparatus for forming a tubular impregnated and unlimited length uniform profile lamina as set forth in claim 62 wherein said carding means engages and combs the layer of filaments at spaced intervals from both the mandrel configuration and from the exterior thereof.

66. The apparatus for forming a tubular impregnated and unlimited length uniform profile lamina as set forth in claim 62 wherein said impregnating means discharges said material from the inner profile configuration of the mandrel and into the layer of filaments thereon.

67. The apparatus for forming a tubular impregnated and unlimited length uniform profile lamina as set forth in claim 62 wherein said impregnating means sequentially discharges said liquid material into the layer of parallel filaments at the outer profile and then the inner profile thereof.

68. Apparatus for forming a tubular impregnated and cured continuous unlimited length multi lamina composite of uniform profile, and including; an elongated bed with an anchor at its one rear end and with traction means at its front end continuously advancing the composite, an elongated mandrel extending parallel to the bed and with its one rear end fixed to said anchor and having a cross section configuration establishing the interior profile of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation supported upon said lay-up section and laying the said second mentioned filaments circumferentially and contiguously around and onto the first mentioned layer of filaments, the mandrel having an impregnation section forward of said lay-up section and impregnating means saturating the layers of filaments with curable liquid material throughout the cross section, and the mandrel having a sizing and curing section forward of said impregnation section and a sizing and curing die having a cross section configuration uniformly spaced from and surrounding the first mentioned configuration of the mandrel to establish the wall thickness and outer profile of the composite, the composite comprising the liquid impregnated previously dry lay-up being advanced by said traction means through a determined space between the mandrel and said sizing and curing die.

69. The apparatus for the formation of tubular unlimited length uniform profile multi lamina composite as set forth in claim 68 wherein said carding means engages and combs one of the layers of filaments at spaced intervals along the mandrel preceeding the sizing and curing section thereof.

70. The apparatus for the formation of tubular unlimited length uniform profile multi lamina composite as set forth in claim 68 wherein said impregnating means discharges said liquid material from the inner profile configuration of the mandrel and into the layers of filaments thereon.

71. The apparatus for the formation of tubular unlimited length uniform profile multi lamina composite as set forth in claim 68 wherein said impregnating means sequentially discharges said liquid material into the exterior layer of filaments and then from the inner profile configuration of the mandrel and into the interior layer of filaments thereon.

72. Apparatus for forming a tubular impregnated and cured continuous unlimited length multi lamina composite of uniform profile, and including; an elongated bed with an anchor at its one rear end and with traction means at its front end continuously advancing the composite, an elongated mandrel extending parallel to the bed and with its one rear end fixed to said anchor and having a cross section configuration establishing the interior profiles of the composite, the mandrel having a lay-up section forward of said anchor and a first distributing means receiving a multiplicity of filaments from a supply thereof and arranging the same in substantially parallel longitudinal formation supported upon said lay-up section, and carding means forward of said distributing means and engaging the arrangement of filaments while laying the same contiguously combed upon the mandrel configuration, and a second distributing means receiving a multiplicity of filaments from a supply thereof and arranging the same in substantially parallel transverse formation supported upon said lay-up section and laying the second mentioned filaments circumferentially and contiguously around and onto the first mentioned layer of filaments, and a third distributing means receiving a multiplicity of filaments from a supply thereof and arranging the same in substantially parallel longitudinal formation supported upon said lay-up section, and carding means forward of the last mentioned distributing means and engaging the arrangement of filaments while laying the same contiguously combed upon the second mentioned layer of filaments, the mandrel having an impregnation section forward of said lay-up section and impregnating means saturating the layers of filaments with curable liquid material throughout their cross section, and the mandrel having a sizing and curing section forward of said impregnation section and a sizing and curing die having a cross section configuration uniformly spaced from and surrounding the first mentioned configuration of the mandrel to establish the wall thickness and outer profile of the composite, the composite comprising the liquid impregnated previously dry lay-up being advanced by said traction means through a determined space between the mandrel and said sizing and curing die.

73. The apparatus for the formation of tubular unlimited length uniform profile multi lamina composite as set forth in claim 72 wherein said carding means engages and combs one of the layers of filaments at spaced intervals along the mandrel preceeding the curing section thereof.

74. The apparatus for the formation of tubular unlimited length uniform profile multi lamina composite as set forth in claim 72 wherein said impregnating means discharges said liquid material from the inner profile configuration of the mandrel and into the layers of filaments thereon.

75. The apparatus for the formation of tubular unlimited length uniform profile multi lamina composite as set forth in claim 72 wherein said impregnating means sequentially discharges said liquid material into the exterior layer of filaments and then from the inner profile configuration of the mandrel and into the interior layer of filaments thereon.

* * * * *